United States Patent
Ohtsuki et al.

(10) Patent No.: US 9,742,206 B2
(45) Date of Patent: Aug. 22, 2017

(54) RECHARGEABLE BATTERY SYSTEM AND METHOD OF CONTROLLING POWER CONSUMPTION

(71) Applicant: SANYO ELECTRIC CO., LTD., Osaka (JP)

(72) Inventors: Yousuke Ohtsuki, Kyoto (JP); Yasuo Okuda, Kyoto (JP); Kazuaki Okamoto, Chiba (JP); Yuuki Hirata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 14/633,602

(22) Filed: Feb. 27, 2015

(65) Prior Publication Data
US 2015/0280462 A1 Oct. 1, 2015

(30) Foreign Application Priority Data

Mar. 28, 2014 (JP) .................................. 2014-070328

(51) Int. Cl.
*H02J 7/00* (2006.01)

(52) U.S. Cl.
CPC .......... *H02J 7/0016* (2013.01); *H02J 7/0021* (2013.01); *H02J 7/0022* (2013.01)

(58) Field of Classification Search
CPC ........ H02J 7/0024; H02J 7/0073; H02J 7/345; H02J 7/0013; H02J 7/0014; Y02E 60/13
USPC ....................................................... 320/116
See application file for complete search history.

(56) References Cited

U.S. PATENT DOCUMENTS

| | | | | |
|---|---|---|---|---|
| 2008/0246488 A1* | 10/2008 | Bosse | ............ | G01R 19/16542 324/426 |
| 2009/0027009 A1 | 1/2009 | Sivertsen | | |
| 2010/0286938 A1 | 11/2010 | Kaneko | | |
| 2013/0088201 A1* | 4/2013 | Iwasawa | ............ | G01R 31/3679 320/118 |

FOREIGN PATENT DOCUMENTS

| | | |
|---|---|---|
| JP | 2008-235032 A | 10/2008 |
| JP | 2011-078201 A | 4/2011 |

OTHER PUBLICATIONS

European Search Report EP Application No. 15 15 7169.2 mailed Feb. 1, 2016.
Daniel Kilper et al., "Energy Challenges in Current and Future Optical Transmission Networks", Proceedings of the IEEE, vol. 100, No. 5, May 2012, pp. 1168-1187.

* cited by examiner

*Primary Examiner* — Arun Williams
(74) *Attorney, Agent, or Firm* — McDermott Will & Emery LLP

(57) ABSTRACT

A rechargeable battery system includes: a first battery pack; and a second battery pack in a daisy chain connection with the first battery pack to form a communication path, the second battery pack consuming a larger power for communication than a power consumed in the first battery pack for communication. A power consumed in the second battery pack for an additional process other than communication is smaller than power consumed in the first battery pack for the additional process.

7 Claims, 5 Drawing Sheets

RECHARGEABLE BATTERY SYSTEM AND METHOD OF CONTROLLING POWER CONSUMPTION

This application is based upon and claims the benefit of priority from the prior Japanese Patent Application No. 2014-070328, filed on Mar. 28, 2014, the entire contents of which are hereby incorporated by reference.

BACKGROUND OF THE INVENTION

1. Field of the Invention

The present invention relates to a rechargeable battery system and a method of controlling power consumption in a rechargeable battery system.

2. Description of the Related Art

Rechargeable battery systems provided with a plurality of battery packs including rechargeable battery cells are known. The rechargeable battery systems are provided with communication functions for managing the battery packs (see, for example, Japanese Unexamined Publication No. JP2011-78201).

In a rechargeable battery system like this, a large number of rechargeable batteries are assembled for use. The plurality of batteries may be connected in series to provide a large capacity and a large output. Physical properties such as the temperature, voltage, electrical energy, etc. of the battery packs are collected in order to manage the larger number of battery packs assembled.

Generally, the larger the data volume of physical parameters used for management of battery packs, the larger the electric power required for communication thereof. Given that the electric power required for data communication used for management of rechargeable batteries is provided by the rechargeable batteries, power consumption of the rechargeable batteries forming the rechargeable battery system may be unbalanced if data that should be communicated is concentrated on a particular rechargeable battery.

The present invention addresses this issue and a purpose thereof is to provide a method of leveling power consumption in battery packs where rechargeable batteries are connected in series.

SUMMARY OF THE INVENTION

The rechargeable battery system according to an embodiment of the present invention includes a first battery pack; and a second battery pack in a daisy chain connection with the first battery pack to form a communication path, the second battery pack consuming a larger power for communication than a power consumed in the first battery pack for communication. A power consumed in the second battery pack for an additional process other than communication is smaller than a power consumed in the first battery pack for the additional process.

The rechargeable battery system may further include a management unit that is connected to the first battery pack and the second battery pack in a daisy chain and manages the first battery pack and the second battery pack. The management unit may derive information related to a power that should be consumed for the additional process in the first battery pack and the second battery pack, by referring to a volume of data communicated in the first battery pack and the second battery pack.

The first battery pack and the second battery pack may each be provided with a light emitting diode (LED) for indicating a status. The additional process is lighting of the LED, and a power consumed in the second battery pack to light the LED is smaller than that of the first battery pack.

The first battery pack and the second battery pack may turn the LED off during communication and light the LED when communication is not proceeding.

Information related to a power consumed in each of the first battery pack and the second battery pack for the additional process may be predefined depending on a position of connection in the daisy chain connection, and a power consumed for the additional process may be derived based on the information.

Another embodiment of the present invention also relates to a rechargeable battery system. The rechargeable battery system includes a first battery pack; and a second battery pack in a daisy chain connection with the first battery pack to form a communication path, a volume of communication data in the second battery pack being larger than that of the first battery pack. Transmission time consumed in the second battery pack for communication is shorter than transmission time consumed in the first battery pack for communication.

Still another embodiment of the present invention relates to a method of controlling power consumption. The method is adapted for a system including a first battery pack; and a second battery pack in a daisy chain connection with the first battery pack to form a communication path, the second battery pack consuming a larger power for communication than a power consumed in the first battery pack for communication, wherein a power consumed in the second battery pack for an additional process other than communication is smaller than a power consumed in the first battery pack for the additional process.

BRIEF DESCRIPTION OF THE DRAWINGS

The figures depict one or more implementations in accordance with the present teaching, by way of example only, not by way of limitations. In the figures, like reference numerals refer to the same or similar elements.

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
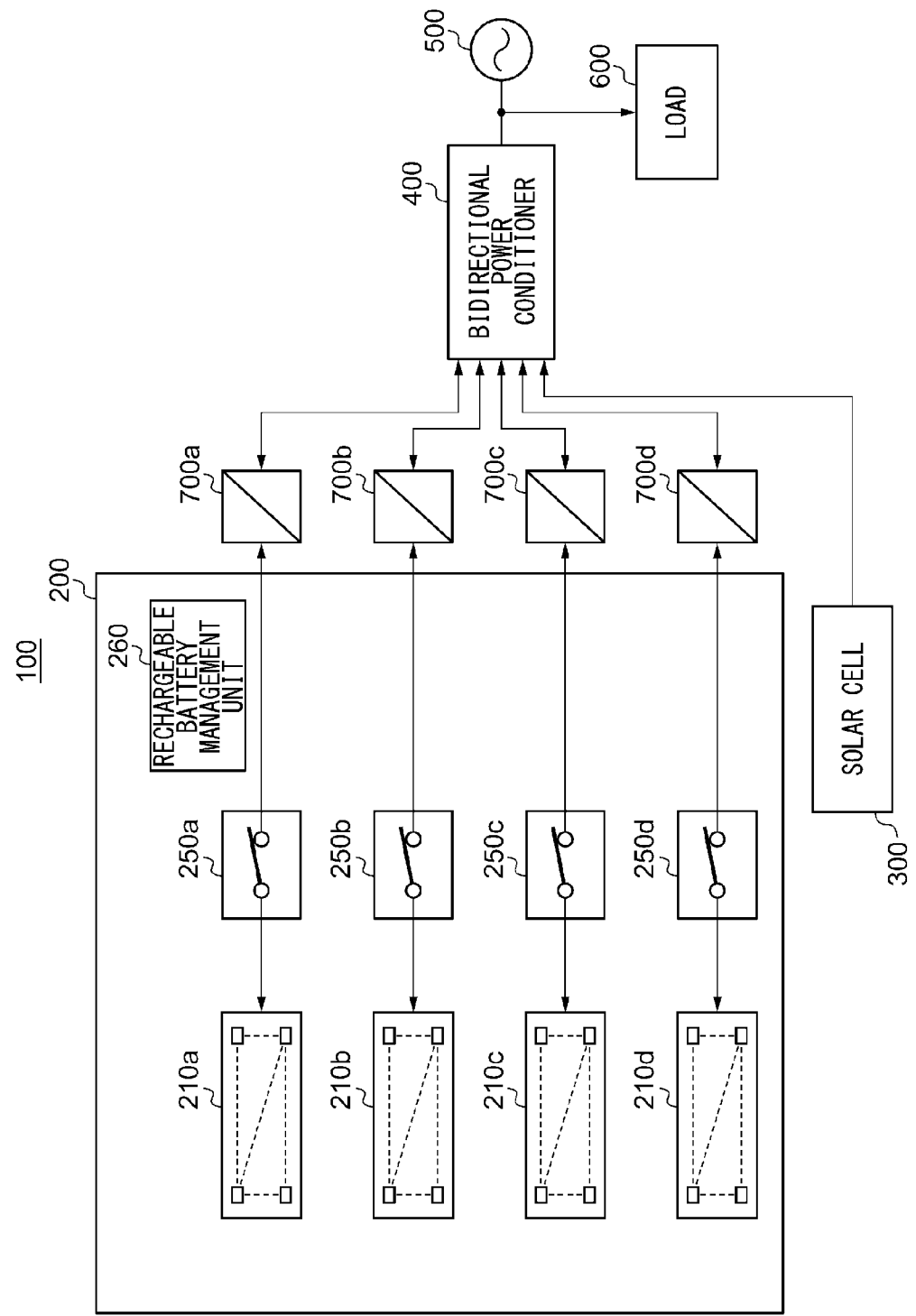
FIG. 1 schematically shows a power distribution system according to an embodiment of the present invention.

FIG. 1 schematically shows a power distribution system 100 according to an embodiment of the present invention. The power distribution system 100 according to the embodiment includes a rechargeable battery container 200 including a plurality of rechargeable batteries, a solar cell 300 (a renewable energy power generator), a bidirectional power conditioner 400, a commercial power supply 500, a load 600, and a DC/DC converter 700.

The commercial power supply 500 is an AC power supply for supplying power from a utility company. The solar cell 300 is a power generator for directly converting light energy into power using photovoltaic effect. A silicon solar cell, a solar cell formed by any of various compound semiconductors, a dye-sensitised solar cell (organic solar cell), etc. is used as the solar cell 300. The power distribution system 100 may be provided with a fuel cell or a wind power generator (not shown) instead of or in addition to the solar cell 300. A wind power generator normally generates AC power. Therefore, if the power distribution system 100 is provided with a wind power generator, an AC/AC converter (not shown) is provided in a stage preceding the bidirectional power conditioner 400.

The bidirectional power conditioner 400 is connected at one end to the rechargeable battery container 200 and the solar cell 300. The bidirectional power conditioner 400 is also connected at the other end to the commercial power supply 500. The bidirectional power conditioner 400 is provided with a bidirectional inverter (not shown). The inverter converts the DC power generated by the solar cell 300 or the DC power discharged by the rechargeable battery container 200 into AC power and converts the AC power from the commercial power supply 500 into DC power. A DC/DC converter 700a is provided in the conducting path between a switch module 250a and the bidirectional power conditioner 400. A DC/DC converter 700b is provided in the electrically-conducting path between a switch module 250b and the bidirectional power conditioner 400. Similarly, a DC/DC converter 700c is provided between a switch module 250c and the bidirectional power conditioner 400, and a DC/DC converter 700d is provided between a switch module 250d and the bidirectional power conditioner 400. Hereinafter, the DC/DC converters 700a through 700d will be generically referred to as "DC/DC converters 700" except when distinction is indicated. The DC/DC converters 700 step up or step down the DC power converted by the bidirectional power conditioner and cause the plurality of rechargeable batteries to charge or discharge power.

The rechargeable battery container 200 is provided with a plurality of rechargeable battery units 210 each including a predetermined number of battery packs. In the example shown in FIG. 1, 4 rechargeable battery units 210, i.e., rechargeable battery units 210a through 210d, are shown. Hereinafter, the rechargeable battery units 210a through 210d will be generically referred to as "rechargeable battery units 210" except when distinction is indicated. The rechargeable battery container 200 is provided with a rechargeable battery management unit (Battery Management Unit; BMR) 260 for managing the battery packs provided in the rechargeable battery units 210. The rechargeable battery container 200 also includes switch modules 250a through 250d capable of disconnecting the conducting path between the rechargeable battery units 210a through 210d and the rechargeable battery management unit 260.

The switch module 250a is provided in the conducting path between the rechargeable battery unit 210a and the DC/DC converter 700a, and the switch module 250b is provided in the conducting path between the rechargeable battery unit 210b and the DC/DC converter 700b. Similarly, the switch module 250c is provided between the rechargeable battery unit 210c and the DC/DC converter 700c, and the switch module 250d is provided between the rechargeable battery unit 210d and the DC/DC converter 700d. Hereinafter, the switch modules 250a through 250d will be generically referred to as "switch modules 250" except when distinction is indicated.

The rechargeable battery management unit 260 according to the embodiment manages the operation of the plurality of rechargeable battery units 210 and the switch modules 250. The rechargeable battery management unit 260 builds a rechargeable battery system 240 from one rechargeable battery unit 210 and one switch module 250.

Figure 2:
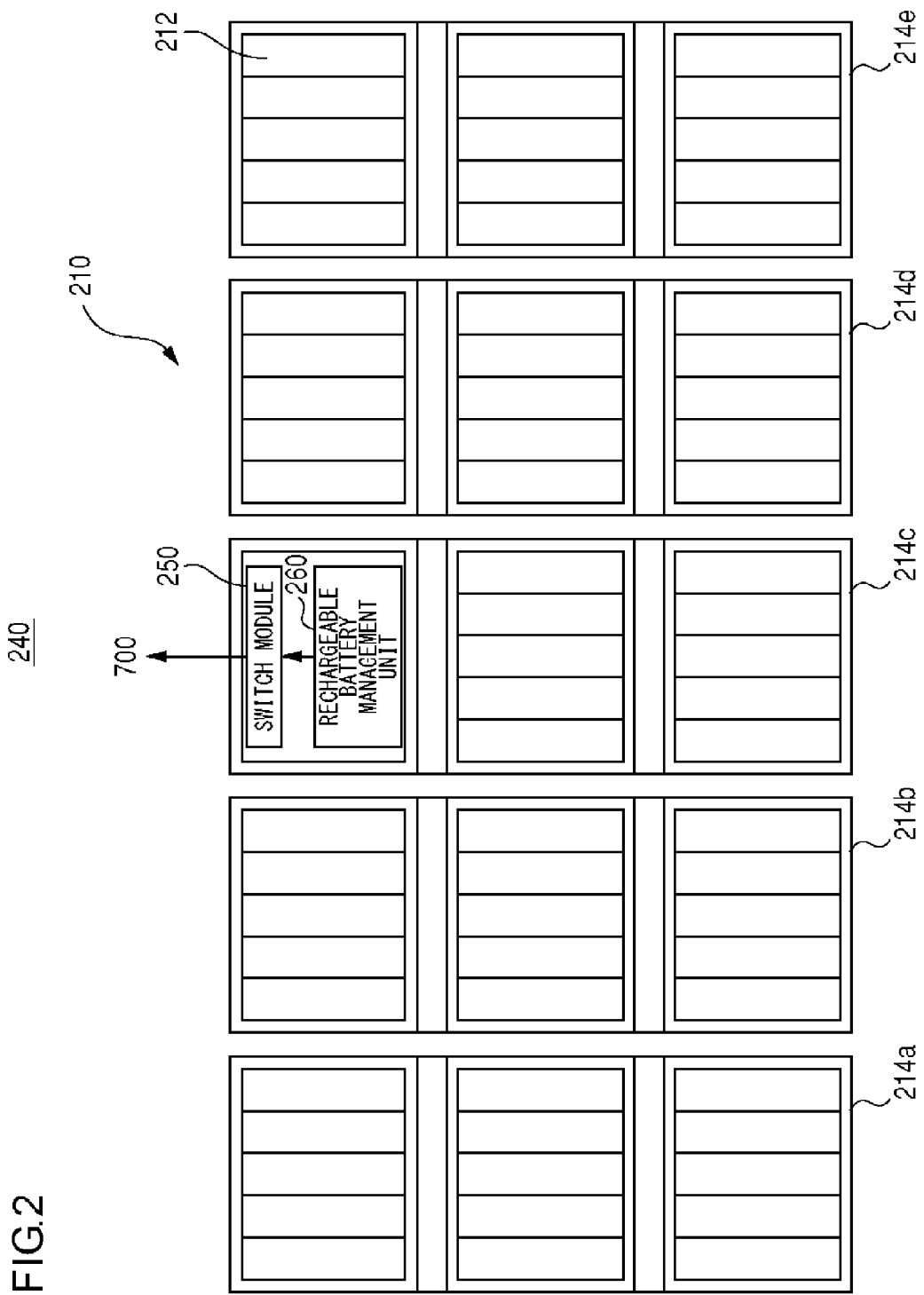
FIG. 2 schematically shows an exemplary appearance of the rechargeable battery system according to the embodiment.

FIG. 2 schematically shows an exemplary appearance of the rechargeable battery system 240 according to the embodiment. The rechargeable battery system 240 is provided with the rechargeable battery unit 210, the switch module 250, and the rechargeable battery management unit 260. The rechargeable battery unit 210 includes 70 battery packs 212. Each battery pack 212 is a rechargeable secondary battery. The battery pack 212 is implemented by, for example, a lithium ion secondary battery. The battery pack 212 is provided with a plurality of rechargeable battery cells described later.

The battery pack 212 is charged by the power of the commercial power supply 500 converted into DC power by the bidirectional power conditioner 400. The rechargeable battery management unit 260 measures various physical parameters such as the state of charge (SOC) and temperature of the battery packs 212 and provides the measured physical parameters to the bidirectional power conditioner 400. The rechargeable battery management unit 260 also performs other type of control. For example, the rechargeable battery management unit 260 controls a fan (not shown) to cool the battery packs 212. In this sense, the rechargeable battery management unit 260 functions as a controller for controlling the battery packs 212.

Referring to FIG. 2, the rectangle denoted by numeral 212 represents a single battery pack 212. For brevity, not all of the battery packs 212 are labeled with a reference numeral. Rectangles similar to the rectangle denoted by numeral 212 all represent battery packs 212. As shown in FIG. 2, the rechargeable battery unit 210 is provided with 5 battery pack racks 214, i.e., battery pack racks 214a through 214e. Vertically, each battery pack rack 214 is provided with 3 accommodating spaces each capable of accommodating 5 battery packs 212. Therefore, one battery pack rack 214 is capable of accommodating a maximum of 5×3=15 battery packs. One of the accommodating spaces provided in the battery pack rack 214c of the rechargeable battery unit 210 according to the embodiment accommodates the switch module 250 and the rechargeable battery management unit 260 instead of the battery packs 212. Therefore, a total of 14×5=70 battery packs 212 are accommodated.

Each battery pack 212 according to the embodiment is capable of charging 1.8 kWh electric energy. Therefore, the electric energy of the rechargeable battery unit 210 as a whole is 1.8 kWh×70=126 kWh. Since the rechargeable battery container 200 is provided with 4 rechargeable battery units 210, the power distribution system 100 according to the embodiment charges 126 kWh×4=540 kWh electric energy as a whole. The solar cell 300 generates 250 kW power.

Figure 3:
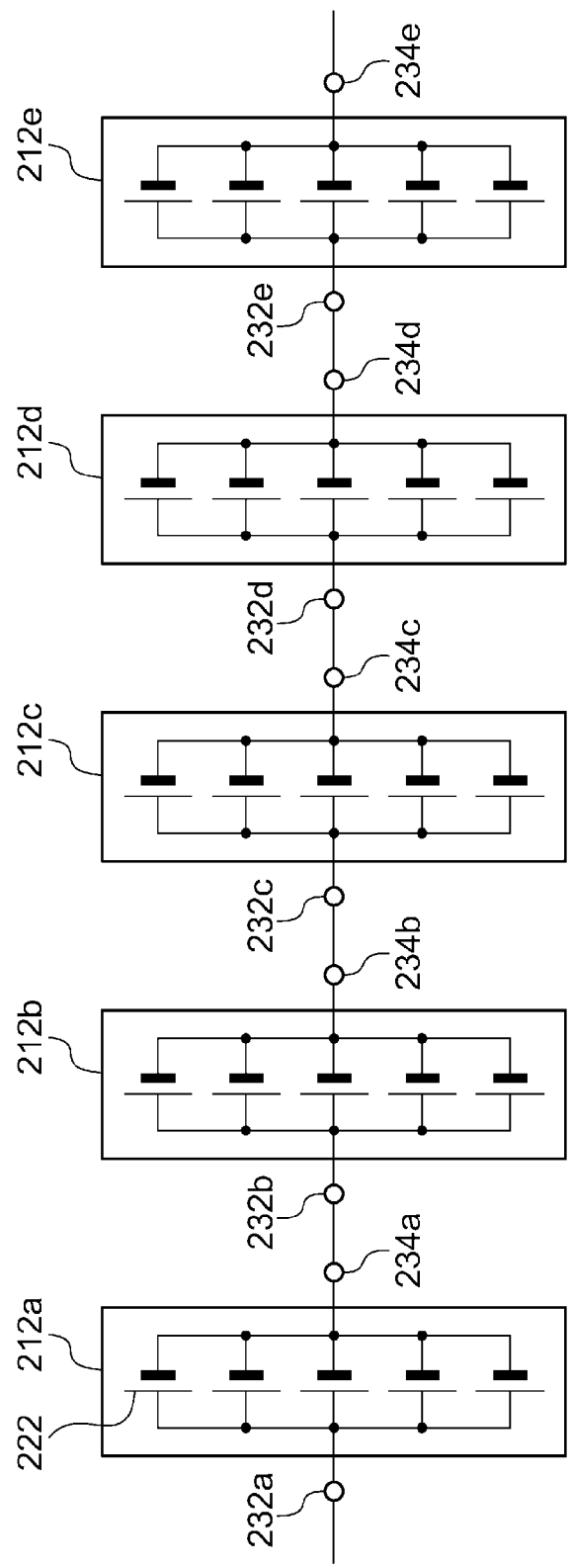
FIG. 3 schematically shows 5 battery packs connected in parallel.

FIG. 3 schematically shows 5 battery packs 212a-212e connected in series. FIG. 3 shows the battery packs 212 accommodated in one accommodating space in the battery pack rack 214 shown in FIG. 2. As shown in FIG. 3, the battery pack 212a is provided with a positive electrode terminal 232a and a negative electrode terminal 234b. Similarly, the battery packs 212b-212e are provided with positive electrode terminals 232b-232e and negative electrode terminals 234b-234e, respectively.

The negative electrode terminal 234a of the battery pack 212a is connected to the positive electrode terminal 232b of the battery pack 212b. The negative electrode terminal 234b of the battery pack 212b is connected to the positive electrode terminal 232c of the battery pack 212c. Similarly, the 5 battery packs 212a-212e are connected in series.

Referring to FIG. 3, each battery pack 212 is provided with 5 rechargeable battery cells 222 but not all of the battery cells are labeled with a reference numeral for brevity. The battery pack 212 is built by connecting the 5 rechargeable battery cells 222 in parallel. The number of rechargeable battery cells 222 provided in the battery pack 212 may be 4 or less or 6 or more.

Figure 4B:
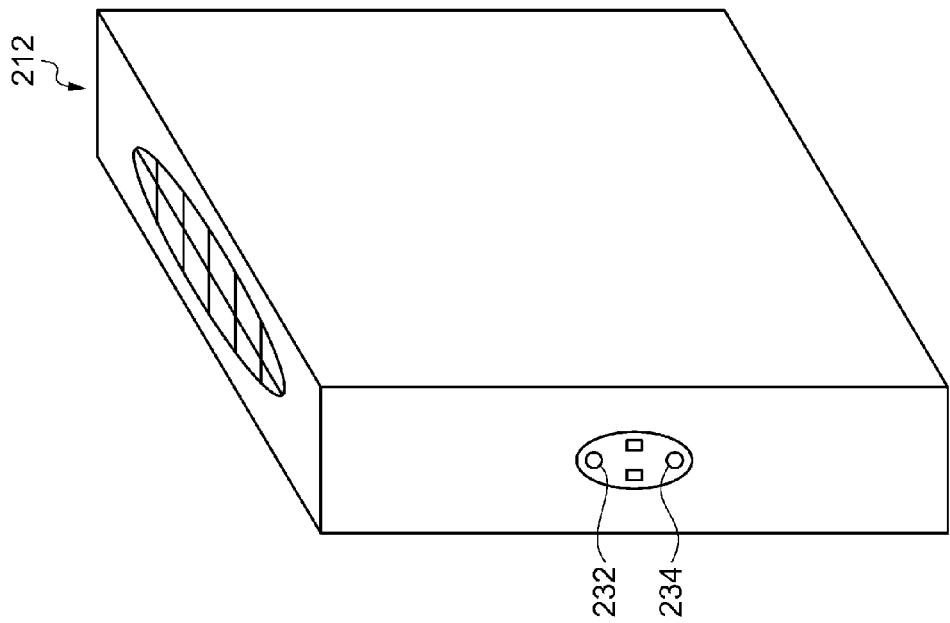
FIGS. 4A-4B are perspective views schematically showing the appearance of the battery pack according to the embodiment.
Figure 4A:
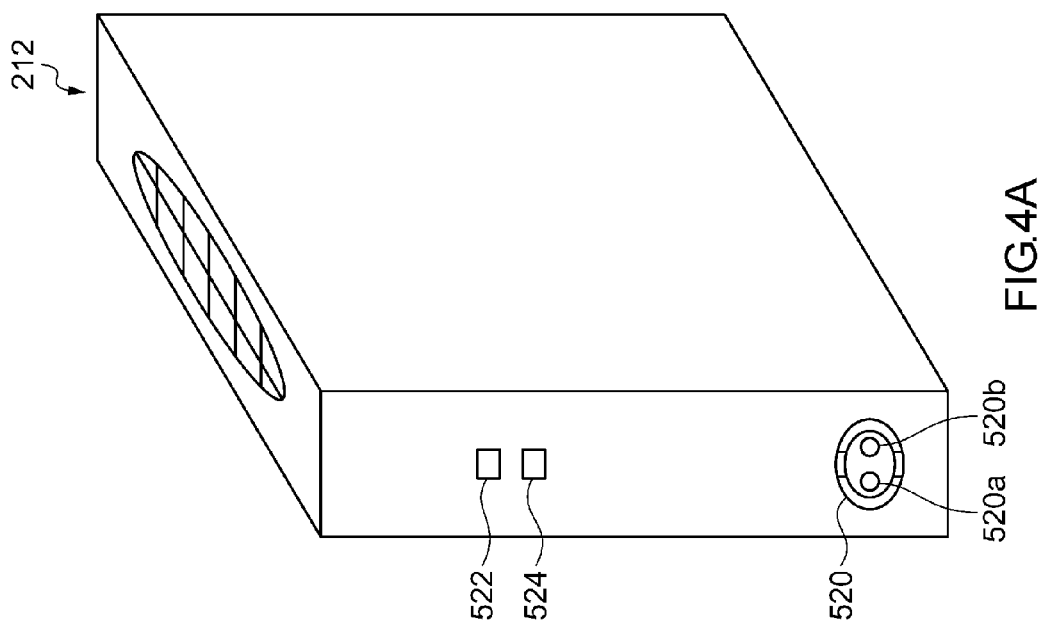

FIGS. 4A-4B are perspective views schematically showing the appearance of the battery pack 212 according to the embodiment. More specifically, FIG. 4A is a front perspective view of the battery pack 212, and FIG. 4B is a rear perspective view of the battery pack 212.

As shown in FIGS. 4A-4B, the battery pack 212 is provided with a vent 526 on the upper surface thereof. The battery pack 212 is also provided with a vent on the bottom surface thereof (not shown). This allows air to flow in the battery pack 212 to cool the battery pack 212.

As shown in FIG. 4A, the front panel of the battery pack 212 is provided with a first LED (Light Emitting Diode) 522 and a second LED 524 used to indicate the status of the battery pack 212. The first LED 522 flashes green when the battery pack 212 is normally communicating with the rechargeable battery management unit 260 or other battery packs 212. The second LED 524 is lighted red in the event that the battery pack 212 is in trouble for some reason.

The front panel of the battery pack 212 is also provided with an optical fiber connector 520. The optical fiber connector 520 includes a first optical fiber connector 520a and a second optical fiber connector 520b, which are connected to a light receiving module and a light transmitting module, respectively. The light receiving module and the light transmitting module are housed in the casing of the battery pack 212.

As shown in FIG. 4B, the positive electrode terminal 232 and the negative electrode terminal 234 described with reference to FIG. 3 are provided on the rear surface of the battery pack 212.

The above description of the rechargeable battery system 240 according to the embodiment primarily concerns the conducting path. A description will now be given of a management data communication path for transmitting management data for managing the battery packs 212 forming the rechargeable battery unit 210.

For the purpose of managing the battery packs 212, the rechargeable battery management unit 260 measures various physical parameters such SOC and temperature of the battery packs 212. The rechargeable battery management unit 260 and the battery packs 212 are connected by a management data communication path different from the power supply line.

Figure 5:
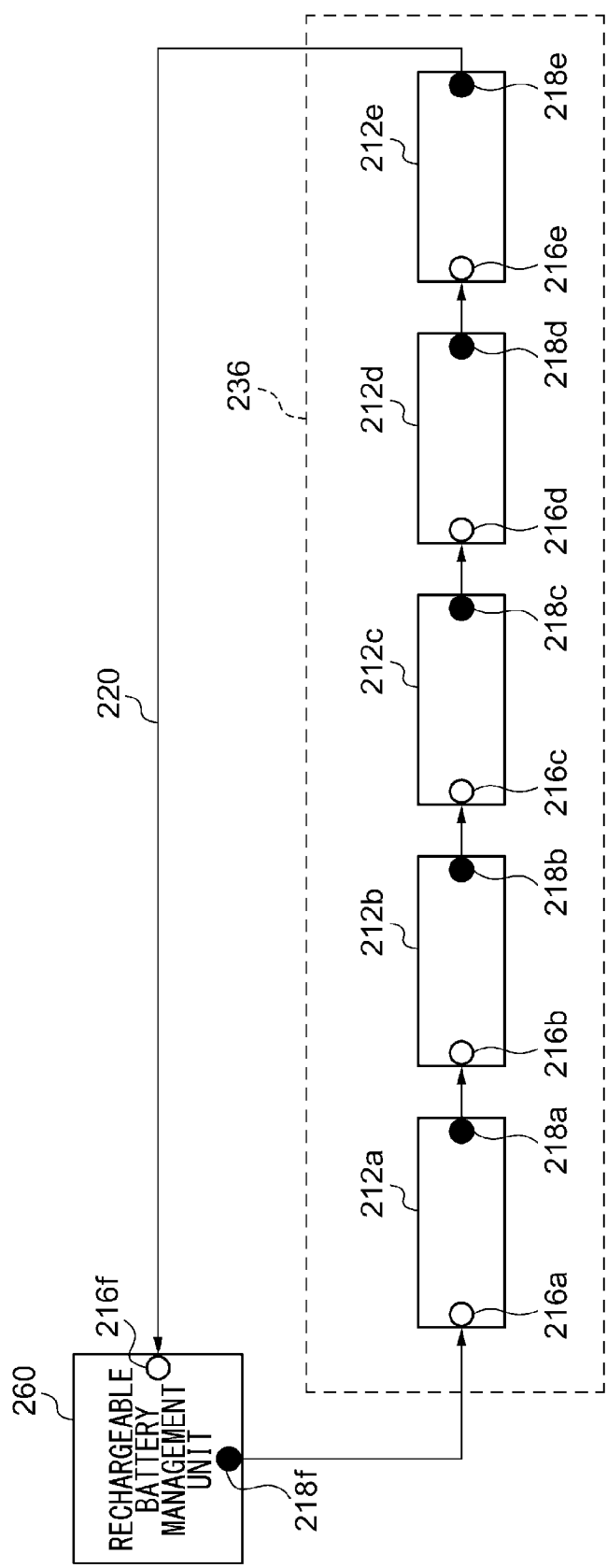
FIG. 5 schematically shows an example of the management data communication path.

FIG. 5 schematically shows an example of the management data communication path 220. As shown in FIG. 5, the rechargeable battery management unit 260 retrieves the management data for the battery packs 212. 5 battery packs 212 being defined as a minimum unit of management. The management data communication path 220 is a communication path connecting the rechargeable battery management unit 260 and a rechargeable battery group 236 including the 5 battery packs 212. Each of the rechargeable battery management unit 260 and the battery packs 212 is provided with a pair of a light receiving module 216 and a light transmitting module 218. Referring to FIG. 5, the battery pack 212a is provided with a light receiving module 216a and a light transmitting module 218a, and the battery pack 212b is provided with a light receiving module 216b and a light transmitting module 218b. The battery packs 212c, 212d, and 212e are similarly configured. The rechargeable battery management unit 260 is provided with a light receiving module 216f and a light transmitting module 218f. The modules are generically referred to as light receiving modules 216 and light transmitting modules 218 except when distinction is indicated.

The management data communication path 220 is implemented by an optical fiber. The rechargeable battery management unit 260 communicates with the battery packs 212 using a predefined communication protocol. A unique address is assigned to each of the battery packs 212 according to the embodiment. The rechargeable battery management unit 260 can identify the respective rechargeable batteries using the address. The rechargeable battery management unit 260 links the address for identifying the battery pack 212 with a command for identifying the physical parameter sought to be retrieved, in accordance with the predefined communication protocol, and transmits the resultant management data the management data communication path 220.

When the rechargeable battery management unit 260 transmits the management data to the management data communication path, the battery pack 212 corresponding to the address included in the management data turns the information related to the battery pack 212 (e.g., the physical parameter corresponding to the command included in the management data) into data and transmits the resultant data to the management data communication path 220. This allows the rechargeable battery management unit 260 to retrieve the desired physical parameter of a designated battery pack 212. Thus, the term "management data", used in this specification, for managing the battery packs 212 means data that links an address for identifying the battery pack 212 with a command for identifying a physical parameter sought to be retrieved, in accordance with a predefined communication protocol, and data for the physical parameter transmitted by the battery pack 212 in response to the command.

The light transmitting module 218 implements data transmission by lighting a communication LED (not shown). As shown in FIG. 5, the light transmitting module 218 and the light receiving module 216 of the adjacent battery packs 212 in a series connection are connected by an optical fiber. Further, the light transmitting module 218f provided in the rechargeable battery management unit 260 is connected by an optical fiber to the light receiving module 216a provided in the first battery pack 212a. The light transmitting module 218e provided in the fifth battery pack 212e is connected by an optical fiber to the light receiving module 216f provided in the rechargeable battery management unit 260. This allows the battery packs 212 and the rechargeable battery management unit 260 to be connected by the optical fibers in a daisy chain, thereby forming the management data communication path 220.

When the battery pack 212 receives the management data that flows through the management data communication path 220, the battery pack 212 refers to the address in the management data and checks it against the address assigned to the battery pack 212. If the addresses match, the battery pack 212 runs the command included in the management data and transmits data for the result to the management data communication path 220 along with the received management data. If the addresses do not match, the battery pack 212 transmits the received management data intact to the management data communication path 220.

It will be assumed that the rechargeable battery management unit 260 transmits, to the management data communication path 220, management data including the address for identifying the battery pack 212b in the rechargeable battery group 236 and a command requiring transmission of temperature data for the battery pack 212b, in order to retrieve temperature data for the battery pack 212b. Referring to the management data communication path 220 shown in FIG. 5, the battery pack 212a located between the rechargeable battery management unit 260 and the battery pack 212b, i.e., located upstream of the battery pack 212b, transmits the received management data intact to the management data communication path 220 Meanwhile, the battery packs 212c, 212d, and 212e located downstream of the battery pack 212b, transmits the temperature data for the battery pack 212b (response from the battery pack 212b) in addition to the management data transmitted by the rechargeable battery management unit 260.

Thus, in a loop of daisy chain connection of the management data communication path 220 that starts at the rechargeable battery management unit 260, the volume of data that should be communicated is larger downstream in the management data communication path 220 than upstream in the management data communication path 220. The power used for transmission and reception of the management data is supplied by the battery packs 212. Generally, the larger the volume of management data that should be transmitted or received, the larger the power required for transmission and reception. Therefore, in the management data communication path 220 in which the battery packs are strung together in a loop, starting at the rechargeable battery management unit 260, the battery packs 212 located downstream in the management data communication path 220 consume more power for communication of management data as compared with the battery packs 212 located upstream.

Thus, the rechargeable battery system 240 according to the embodiment is configured such that power consumption is leveled among the battery packs 212 connected in a daisy chain on the management data communication path 220. A description will be given of the leveling of power consumption in the rechargeable battery system 240.

As shown in FIG. 5, the management data communication path 220 in the rechargeable battery system 240 is a looped path that strings together the plurality of battery packs 212, starting at the rechargeable battery management unit 260, and returns to the rechargeable battery management unit 260. It will be assumed that, given the first battery pack 212 and the second battery pack 212 on the management data communication path 220, the power used for communication in the second battery pack 212 is larger than that of the first battery pack 212. In this case, the rechargeable battery system 240 configures the power used in the second battery pack 212 for an additional process other than communication to be smaller than the power used for the additional process in the first battery pack 212.

The term "the power used for communication" in the battery pack 212 refers to power required to flash the communication LED. The term "the power used for an additional process other than communication" refers to the power required to light the first LED 522 in FIG. 4. Therefore, the second battery pack 212 consumes less power to light the first LED 522 than the first battery pack 212. This results in a balance between the power used for communication and the power used for the additional process other than communication in the first battery pack 212 and the second battery pack 212, with the result that power consumption is leveled.

As described above, the first LED 522 flashes green when the battery pack 212 is normally communicating with the rechargeable battery management unit 260 or other battery packs 212. Therefore, the battery pack 212 may turn off the first LED 522 when communicating with the rechargeable battery management unit 260 or other battery packs 212 and turn on the first LED 522 when communication is not proceeding. As a result, the first LED 522 of the battery pack 212 is not lighted when the communication LED is lighted for communication. When the communication LED is not lighted, the first LED 522 is lighted. As a result of the communication LED and the first LED 522 flashing in a mutually complementary manner, power consumption of the battery packs 212 included in the rechargeable battery group 236 is leveled.

As described above, the rechargeable battery system 240 according to the embodiment is capable of leveling power consumption in the rechargeable batteries connected in series.

In particular, power consumption by the battery packs 212 for communication is leveled without directly measuring the status of batteries (e.g., voltage of the battery packs 212). As a result, variation between the battery packs 212 is reduced. Moreover, control for causing the communication LED and the first LED 522 to flash in a mutually complementary manner can be effected by the battery packs 212 independently. Since the battery packs 212 are capable of running a process of standardizing power in a self-reliant manner without being subject to control by the rechargeable battery management unit 260 for managing the battery packs 212, the computational load of the rechargeable battery management unit 260 is reduced.

Described above is an explanation based on an exemplary embodiment. The embodiment is intended to be illustrative only and it will be obvious to those skilled in the art that various modifications to constituting elements and processes could be developed and that such modifications are also within the scope of the present invention.

(First Variation)

The description given above concerns a case of leveling power consumption by causing the communication LED and the first LED 522 of the battery packs 212 to flash in a mutually complementary manner. Power consumption of the communication LED can be retrieved in advance so that power consumption in the battery packs 212 may be determined by calculation based on the volume of communication in the battery packs 212 included in the rechargeable battery group 236. By retrieving power consumption of the first LED 522 in advance as well, power consumption of the battery pack 212 can be leveled with higher precision.

It is assumed that the power consumed by the n-th battery pack 212 in the daisy chain connection for communication is denoted by $P_i$ ($i=1, \ldots, N$; N denotes the number of battery packs 212 included in the rechargeable battery group 236). $P_i$ can be derived by determining the time for which the communication LED is lighted, based on the volume of communication in the battery pack 212. It is assumed that the power consumed for communication in the battery pack 212 with the largest volume of communication in the daisy chain is denoted by $P_{max}$. Normally, $P_{max}=P_N$. In this case, the power Si used by the i-th battery pack 212 for the additional process will be such that Si=Pmax−Pi.

The power Si used by the i-th battery pack 212 for the additional process may be derived by the rechargeable battery management unit 260, which functions as a management unit for the battery packs 212. The rechargeable battery management unit 260 issues a battery data request command to the battery packs 212 and receives battery data. The rechargeable battery management unit 260 can retrieve the battery data transmitted by the battery packs 212 and so can also retrieve the data volume actually communicated by the battery packs 212 in the daisy chain for communication. The rechargeable battery management unit 260 can derive information related to the power that should be consumed for the additional process (e.g., the power that should be consumed for the additional process in the battery packs 212, the time for which the first LED 522 should be lighted, etc.), by referring to the volume of data communicated in the battery packs 212.

Each of the battery pack 212 lights the first LED based on the information related to the power that should be consumed for the additional process as derived by the rechargeable battery management unit 260. The rechargeable battery management unit 260 may derive the information related to the power that should be consumed for the additional process at short periods (e.g., every 5 minutes) and transmit the information to the battery packs 212. Alternatively, the rechargeable battery management unit 260 may derive the information related to the power that should be consumed for the additional process at predetermined intervals (e.g., once in 24 hours). In the latter case, the battery packs 212 run the load process at the predetermined intervals.

(Second Variation)

As described above, the power that should be consumed by the battery pack 212 for the additional process can be derived by computation from the volume of data communicated in the battery pack 212. If the battery packs 212 are connected in a daisy chain, the volume of data communicated in the battery pack 212 can be predicted to some extent once the position in the daisy chain is determined. Alternatively, the volume of data can be predicted by experiments.

In this regard, the battery packs 212 may store a table mapping the position in the daisy chain to the information related to the power that should be consumed for the additional process and control the time for which the first LED 522 is lighted by referring to the table. The table may be stored in a storage (not shown) of the battery packs 212. Each of the battery packs 212 can retrieve the position of the battery pack 212 in the daisy chain through the process of assigning addresses. The battery packs 212 can therefore control the time for which to light the first LED 522 by referring to the table read from the storage. As compared to the case of deriving the information related to the power that should be consumed for the additional process by referring to the volume of data communicated, the second variation is advantageous in that the computation time required for derivation and power consumption can be reduced.

(Third Variation)

The description above is directed to leveling power consumption among the battery packs 212 connected in a daisy chain by controlling power consumption in the communication LED and the first LED 522 different from the communication LED. Instead, power consumption amount the battery packs 212 connected in a daisy chain may be leveled by controlling the electric energy used in the battery packs 212 for communication.

The battery data is propagated through the communication path in the form of binarized data. More specifically, the battery packs 212 light the communication LED when the data forming the battery data is "1" and turn off the communication LED when the data is "0". Thus, by converting the binary data into on/off states of the communication LED, the battery data can be propagated via the optical fiber.

Therefore, given the same data communicated by the battery pack 212, the larger the transmission time consumed for communication, the larger the power required for communication. For example, extension of the time for which the communication LED is lighted when the data forming the battery data is "1" results in an increase in the power required for communication. The rechargeable battery system 240 according to the third variation is configured such that, if the volume of communication in the second battery pack 212 is larger than that of the first battery pack 212 connected in a daisy chain, the time consumed for communication in the second battery pack is shorter than the time consumed in the first battery pack for communication.

This ensures that the battery pack 212 with by a smaller volume of data that should be communicated consumes more power for communication of unit data than the battery pack 212 with a larger volume of data. As a result, power consumption of the battery packs 212 connected in a daisy chain is leveled.

(Fourth Variation)

The description given above concerns a case of leveling power consumption by causing the communication LED and the first LED 522 of the battery packs 212 to flash in a mutually complementary manner. In this case, power consumption is leveled by ensuring that the time for which the first LED 522 is lighted is longer than the time for which the communication LED is lighted in an upstream battery pack with a smaller volume of communication than the battery pack 212 located downstream in the daisy chain. Instead of or in addition to extending the time for which the first LED 522 is lighted, the power consumed per unit time to light the first LED 522 may be increased, for the purpose of leveling power consumption. This can be achieved by increasing the light amount of the first LED 522 when lighted. In order to increase the amount of light of the first LED 522 when lighted, the voltage applied to the first LED 522 needs to be increased, and this consequently increase the power consumed per unit time to light the first LED 522.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A rechargeable battery system, comprising:
a first battery pack and a second battery pack; and
a managing unit that manages the first battery pack and the second battery pack, the managing unit, the first battery pack, and the second battery pack being connected in series in the stated order to form a daisy chain connection for communication to be performed among the managing unit, the first battery pack, and the second battery back, and the second battery pack consuming a larger power for the communication than a power consumed in the first battery pack for the communication, wherein a power consumed in the second battery pack for an additional process other than the communication is smaller than a power consumed in the first battery pack for the additional process.

2. The rechargeable battery system according to claim 1, wherein
the management unit derives information related to a power that should be consumed for the additional process in the first battery pack and the second battery pack, by referring to a volume of data communicated in the first battery pack and the second battery pack.

3. The rechargeable battery system according to claim 1, wherein
the first battery pack and the second battery pack is each provided with a light emitting diode (LED) for indicating a status,
the additional process is lighting of the LED, and
a power consumed in the second battery pack to light the LED is smaller than that of the first battery pack.

4. The rechargeable battery system according to claim 3, wherein
the first battery pack and the second battery pack turn the LED off during communication and lights the LED when communication is not proceeding.

5. The rechargeable battery system according to claim 1, wherein
information related to a power consumed in each of the first battery pack and the second battery pack for the additional process is predefined depending on a position of connection in the daisy chain connection, and a power consumed for the additional process is derived based on the information.

6. A rechargeable battery system comprising:
a first battery pack and a second battery pack; and
a managing unit that manages the first battery pack and the second battery pack, the managing unit, the first battery pack, and the second battery pack being connected in series in the stated order to form a daisy chain connection for communication to be performed among the managing unit, the first battery pack, and the second battery back, and a volume of communication data in the second battery pack being larger than that of the first battery pack, wherein
transmission time consumed in the second battery pack for the communication is shorter than transmission time consumed in the first battery pack for the communication.

7. A power consumption control method adapted for a system including a first battery pack; a second battery pack; and a managing unit that manages the first battery pack and the second battery pack, the managing unit, the first battery pack, and the second battery pack being connected in series in the stated order to form a daisy chain connection for communication to be performed among the managing unit, the first battery pack, and the second battery back,
wherein a power consumed in the second battery pack for an additional process other than the communication is smaller than a power consumed in the first battery pack for the additional process.

* * * * *